(12) United States Patent
Perryman, Jr.

(10) Patent No.: US 10,119,728 B2
(45) Date of Patent: Nov. 6, 2018

(54) SOLAR ENERGY COLLECTION AND STORAGE

(76) Inventor: Virgil Dewitt Perryman, Jr., Sterrett, AL (US)

(*) Notice: Subject to any disclaimer, the term of this patent is extended or adjusted under 35 U.S.C. 154(b) by 778 days.

(21) Appl. No.: 13/417,133

(22) Filed: Mar. 9, 2012

(65) Prior Publication Data

US 2013/0233300 A1    Sep. 12, 2013

(51) Int. Cl.
| | |
|---|---|
| F24J 2/04 | (2006.01) |
| F24S 60/00 | (2018.01) |
| F24S 23/71 | (2018.01) |
| F24S 70/20 | (2018.01) |
| F24S 20/20 | (2018.01) |
| F24S 23/70 | (2018.01) |

(52) U.S. Cl.
CPC .............. *F24S 60/00* (2018.05); *F24S 20/20* (2018.05); *F24S 23/71* (2018.05); *F24S 70/20* (2018.05); *F24S 2023/88* (2018.05); *Y02B 10/20* (2013.01); *Y02E 10/41* (2013.01); *Y02E 10/42* (2013.01)

(58) Field of Classification Search
USPC .......................................... 126/640, 676, 684
See application file for complete search history.

(56) References Cited

U.S. PATENT DOCUMENTS

| | | | |
|---|---|---|---|
| 2,920,710 A | 1/1960 | Howard | |
| 3,070,643 A | 12/1962 | Toulmin, Jr. | |
| 3,896,786 A | 7/1975 | Clevett | |
| 4,002,499 A | 1/1977 | Winston | |
| 4,015,962 A * | 4/1977 | Tompkins | F24F 5/00 |
| | | | 126/584 |
| 4,082,413 A * | 4/1978 | Austin | F24J 2/48 |
| | | | 126/908 |
| 4,126,123 A | 11/1978 | Hall | |
| 4,148,300 A * | 4/1979 | Kaufman, Sr. | F24J 2/06 |
| | | | 126/684 |
| 4,224,927 A * | 9/1980 | Patil | C09D 5/32 |
| | | | 126/675 |
| 4,230,095 A | 10/1980 | Winston | |

(Continued)

FOREIGN PATENT DOCUMENTS

| | | |
|---|---|---|
| EP | 1914421 A | 4/2008 |
| JP | S61223452 A | 10/1986 |

(Continued)

OTHER PUBLICATIONS

Encyclopedia Britannica, Accessed on Mar. 17, 2015, Electromagentic Radiation http://www.britannica.com/EBchecked/topic/183228/electromagnetic-radiation/591 83/Infrared-radiation.*

(Continued)

*Primary Examiner* — Vivek Shirsat
(74) *Attorney, Agent, or Firm* — LeonardPatel PC; Michael Aristo Leonard II; Sheetal Suresh Patel

(57) ABSTRACT

A solar energy collection system includes a reflector configured to reflect and focus a majority of solar energy from visible light and infrared spectra. The solar energy collection system also includes a light trap configured to receive concentrated solar energy from the reflector. The light trap includes a black body that is configured to absorb a majority of the concentrated visible light and infrared energy and convert the absorbed energy into thermal energy.

9 Claims, 12 Drawing Sheets

(56) References Cited

U.S. PATENT DOCUMENTS

| | | | |
|---|---|---|---|
| 4,239,033 A * | 12/1980 | Matkovits | F24J 2/10 126/655 |
| 4,285,330 A * | 8/1981 | Shook | F24J 2/14 126/573 |
| 4,286,581 A * | 9/1981 | Atkinson, Jr. | F24J 2/06 126/585 |
| 4,306,541 A | 12/1981 | Morrison et al. | |
| 4,323,053 A * | 4/1982 | McCullough | F24J 2/268 126/649 |
| 4,325,359 A * | 4/1982 | Fries | F24J 2/14 126/678 |
| 4,402,306 A * | 9/1983 | McElroy, Jr. | F24J 2/07 126/619 |
| 4,408,595 A | 10/1983 | Broyles et al. | |
| 4,439,020 A * | 3/1984 | Maruko | F24J 2/06 126/573 |
| 4,455,153 A * | 6/1984 | Jakahi | C10J 3/57 126/684 |
| 4,459,974 A | 7/1984 | Lang | |
| 4,535,837 A * | 8/1985 | Ishii | F28D 20/025 126/618 |
| 4,539,091 A * | 9/1985 | Kaneda | B01D 61/44 126/569 |
| 4,620,771 A | 11/1986 | Dominguez | |
| 4,928,027 A | 5/1990 | Deininger et al. | |
| 5,191,876 A | 3/1993 | Atchley | |
| 6,003,508 A * | 12/1999 | Hoffschmidt | F03G 6/00 126/674 |
| 6,067,982 A | 5/2000 | Harrison | |
| 6,363,928 B1 | 4/2002 | Anderson | |
| 6,691,701 B1 | 2/2004 | Roth | |
| 7,878,192 B2 | 2/2011 | Larsen | |
| 8,119,905 B2 * | 2/2012 | Jensen | F24J 2/06 136/259 |
| 8,978,642 B2 * | 3/2015 | Stettenheim | F24J 2/055 126/666 |
| 2002/0134414 A1 | 9/2002 | Gower | |
| 2006/0033674 A1 | 2/2006 | Essig et al. | |
| 2008/0184989 A1 * | 8/2008 | Mecham | F02C 1/05 126/583 |
| 2009/0065054 A1 | 3/2009 | Gonzalez | |
| 2009/0260621 A1 | 10/2009 | Soucy | |
| 2010/0031954 A1 * | 2/2010 | Blevins | F24J 2/34 126/640 |
| 2010/0065039 A1 | 3/2010 | Chang et al. | |
| 2010/0078012 A1 | 4/2010 | Nix | |
| 2010/0176602 A1 * | 7/2010 | Shinnar | F03G 6/04 290/1 A |
| 2011/0073160 A1 | 3/2011 | Lu | |
| 2011/0297142 A1 | 12/2011 | Chung | |
| 2012/0174908 A1 * | 7/2012 | Geris | H01L 31/0525 126/600 |
| 2012/0180849 A1 * | 7/2012 | Bettencourt | B01J 19/127 136/248 |
| 2012/0266938 A1 | 10/2012 | Goei et al. | |
| 2012/0312292 A1 * | 12/2012 | Bahl | F24D 3/148 126/400 |
| 2013/0228163 A1 * | 9/2013 | Wait | F24J 2/42 126/619 |
| 2013/0233300 A1 * | 9/2013 | Perryman | F24J 2/12 126/640 |
| 2014/0001766 A1 * | 1/2014 | Sayer | F03G 6/04 290/1 R |
| 2015/0316037 A1 * | 11/2015 | Logothetis | F03G 6/068 60/641.15 |
| 2015/0316288 A1 * | 11/2015 | Erickson | F28D 20/0034 126/714 |

FOREIGN PATENT DOCUMENTS

| | | |
|---|---|---|
| WO | 8000489 A | 3/1980 |
| WO | 9012989 A | 11/1990 |
| WO | 0007055 A | 2/2000 |

OTHER PUBLICATIONS

Randich E.; Allred D.D.; Chemically Vapor-Deposited ZrB2 As a Selective Solar Absorber; Thin Solid Films 83 (1981) 393-398.*

3M Solar Light Management PowerPoint Presentation (2009).

3M Solar Mirror Film 1100, http://multimedia.3m.com/mws/mediawebserver?mwsId=66666UuZjcFSLXTtnxMEmXf_EVuQEcuZgVs6EVs6E666666--&fn=SolarFilm1100_DMR.pdf (Jan. 2012).

Accuflect IR Infrared Reflectors, http://accuratus.com/accuflir.html (last accessed Apr. 5, 2012).

DLR Quartz Test Report, Stephanie Mayen, German Aerospace Center, Feb. 2, 2010.

Infrared Transparent Glass Ceramics with Near-Zero Thermal Expansion, http://www.navysbircom/08_S/29.htm (Last accessed Apr. 5, 2012).

Light Traps, R. J. MacG. Dawson, B. E. McDonald, J. Mycielski, and L Pachter, Lcs Technical Memos, MIT-LCS-TM-560, http://publications.csail.mit.edu/lcs/pubs/pdf/MIT-LCS-TM-560.pdf (Oct. 1, 1996).

Massive New Solar Power Tower Set to Energize the Las Vegas Strip, http://inhabitat.com/the-las-vegasstrip-could-soon-be-powered-by-a-solar-tower/solar-tower-crescent-dunes/ (last accessed Feb. 22, 2012).

Nanoporous Glass-ceramics Transparent in Infrared Range to be Used as Optical Sensor: Mechanical and Viscoelastic Properties of the TAS (tellurium-arsenic-selenium) Glass, Gaelle Delaizir, Google Books Abstract, http://books.google.com/books/about/Nanoporous_glass_ceramics_transparent_in.html?id=8vO-9pg0eB4C (last accessed Apr. 5, 2012).

NASA Climatology Resource for Agroclimatology Daily Averaged Data, http://power.larc.nasa_gov/cgi-bin/cgiwrap/solar/agro.cgi?email=agroclim@larc.nasa.gov (last accessed Apr. 5, 2012).

Oxidation Mechanism of ZrB29—SiC Tested in a Solar Furnace above 2200°C, Anne-Sophie Andreani et al., http://www.scientific.net/AST.65.124 (Oct. 27, 2010).

Race Mesh 'RS4' Plastic Diamond Grille Mesh, Body Kit Ltd, http://www.body-kit.co.uk/product.php/12576/2306/race-mesh-rs4-plastic-diamond-grille-mesh (last accessed Apr. 5, 2012).

Radiative properties characterization of ZrB2—SiC-based ultrahigh temperature ceramic at high temperature, Songhe Menga, Hongbo Chena, Jianghua Hua, and Zongwei Wang, http://www.sciencedirect.com/science/article/pii/S0261306910003821 (Jun. 10, 2010).

Solar Radiation, http://www.kippzonen.com/?page/5051/Solar+Radiation.aspx (last accessed Apr. 5, 2012).

Stability of ultra-high-temperature ZrB2—SiC ceramics under simulated atmospheric re-entry conditions, Frederic Monteverde and Raffaele Savino, Journal of the European Ceramic Society 27 (2007) 4797-4805 (Mar. 29, 2007).

The Analysis of an Engineered Diamond Crystal by Photoluminescence Spectroscopy, Steve Lowry, Bob Simler, Mark Wall, Thermo Fisher Scientific, http://www.thermo.com/eThermo/CMA/PDFs/Product/productPDF_56884.PDF (last accessed Apr. 5, 2012).

Wikipedia Analemma Article, http://en.wikipedia.org/wiki/Analemma (last accessed Feb. 28, 2012).

Wikipedia Einstein Solid Article, http://en.wikipedia.org/wiki/Einstein_solid (last accessed Apr. 5, 2012).

Wikipedia Fresnel Lens Article, http://en.wikipedia.org/wiki/Fresnel_lens (last accessed Mar. 13, 2012).

Wikipedia Grille Article, http:llen.wikipedia.org/wiki/Grille (last accessed Apr. 5, 2012).

(56) References Cited

OTHER PUBLICATIONS

Wikipedia Infrared Article, http://en.wikipedia.org/wikiInfrared (last accessed on Feb. 16, 2012).
Wikipedia Optical Coating Article, http://en.wikipedia.org/wiki/Optical_coating (last accessed Apr. 5, 2012).
Wikipedia Solar Thermal Energy Article, http://en.wikipedia.org/wiki/Solar_thermal_energy (last accessed Feb. 16, 2012).
Wikipedia Transparency and Translucency Article, http://en.wikipedia.org/wiki/Transparency_and_translucency (Last accessed Apr. 5, 2012).
George R. Blum, "Restriction Requirement," issued on Aug. 14, 2014 for U.S. Appl. No. 13/434,979.
International Search Report and Written Opinion issued in corresponding PCT Application No. PCT/US13/29736 dated Jun. 21, 2013.
International Search Report and Written Opinion issued in PCT Application No. PCT/US13/34525 dated Jul. 15, 2013.
International Search Report and Written Opinion issued in PCT Application No. PCT/US13/34533 dated Jul. 15, 2013.
Vivek K. Shirsat, "Non-Final Office Action," dated Oct. 14, 2014 for U.S. Appl. No. 13/434,953.
George R. Blum, "Non-Final Office Action," dated Sep. 12, 2014 for U.S. Appl. No. 13/434,979.

* cited by examiner

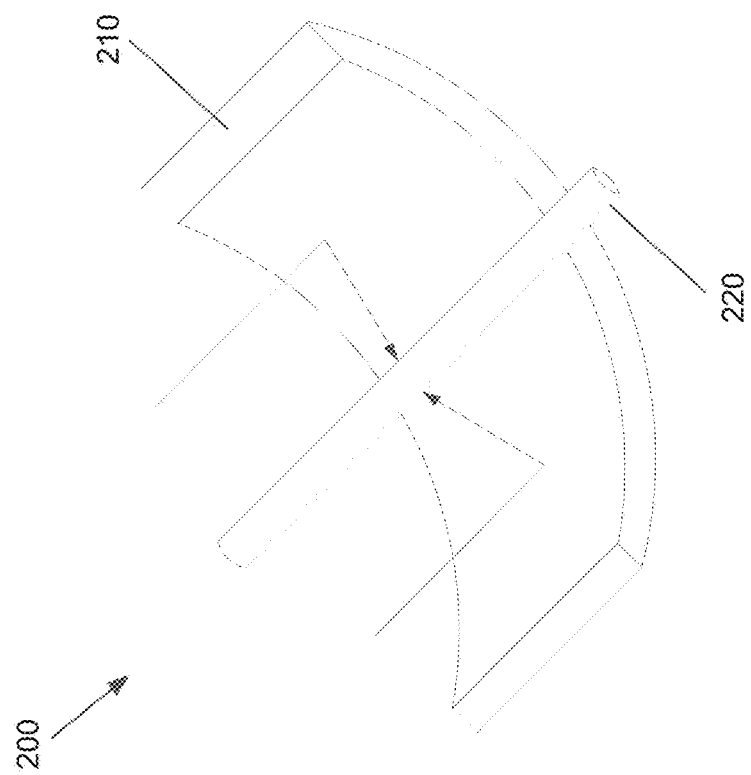

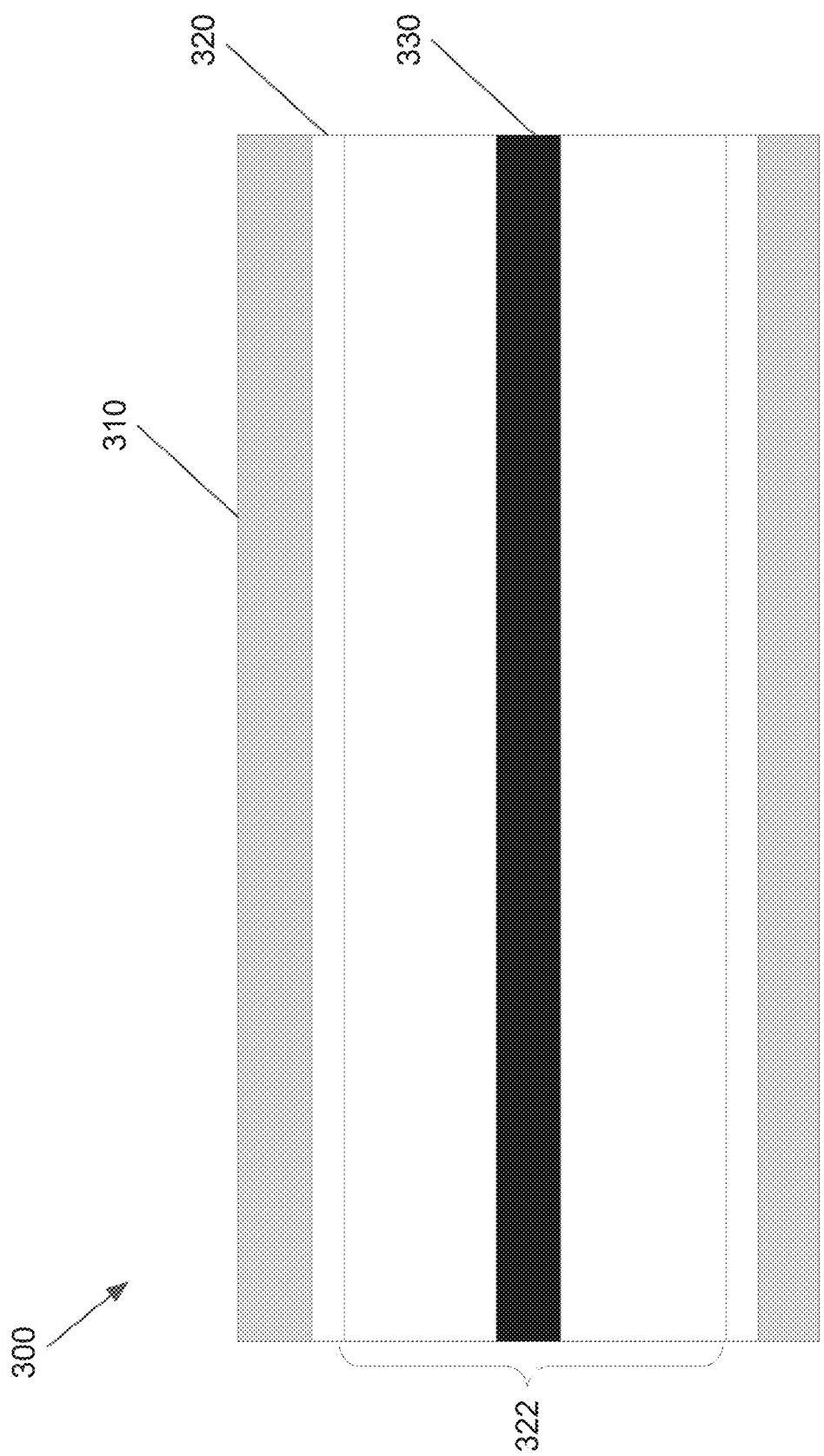

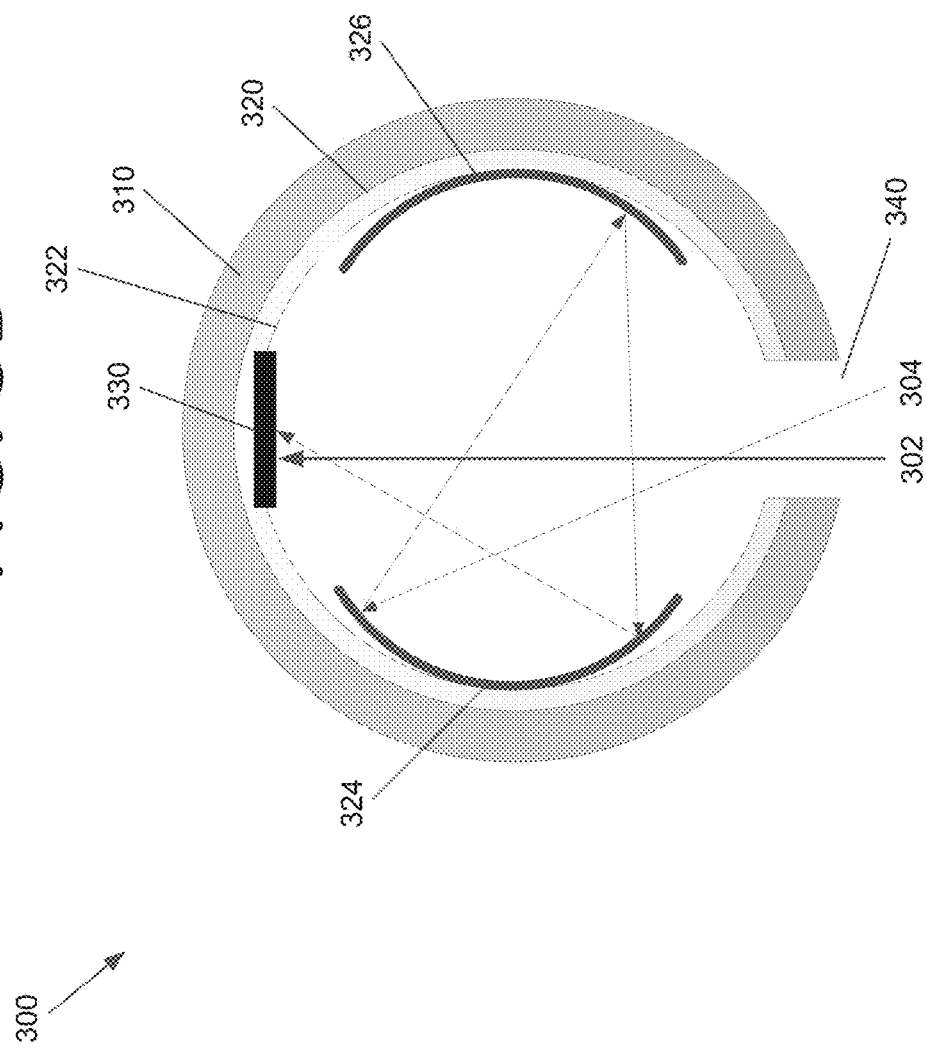

SOLAR ENERGY COLLECTION AND STORAGE

FIELD

The present invention generally relates to collecting energy from photons, and more specifically, to collecting and storing energy from photons from various spectra, including infrared.

BACKGROUND

Conventional solar thermal energy systems use light to generate heat, and such systems operate in a similar manner. These systems have a surface by which the energy of the Sun is absorbed, such as simple hot water heaters, or a surface that reflects the solar energy to a secondary point where it is absorbed or, in the case of concentrated solar, lenses or mirrors are used to increase the Sun's intensity by focusing large amounts of energy on a small absorptive surface. This is the case with solar troughs, parabolic dishes, solar towers, and variations in between.

However, conventional systems only reflect visible light and some of the ultraviolet (UV) spectrum in significant quantities, which account for only 47% and 2%, respectively, of the solar energy that reaches the Earth. Further, visible light and UV light are unreliable sources that are only available in useful quantities during the day and when clouds, fog, haze, and other such blocking bodies are not obstructing the Sun.

SUMMARY

Certain embodiments of the present invention may provide solutions to the problems and needs in the art that have not yet been fully identified, appreciated, or solved by current solar thermal technologies. For example, some embodiments of the present invention harness solar energy from multiple spectra, including infrared, to generate thermal energy. Many embodiments of the present invention can be applied to existing systems by adding a light trap with at least one black body and coating a reflector with highly solar reflective film.

In one embodiment, an apparatus includes a reflector configured to reflect and focus a majority of solar energy from visible light and infrared spectra. The apparatus also includes a light trap configured to receive concentrated solar energy from the reflector. The light trap includes a black body that is configured to absorb a majority of the concentrated visible light and infrared energy and convert the absorbed energy into thermal energy.

In another embodiment, a thermal energy collection apparatus includes a reflector configured to reflect and focus a majority of solar energy from visible light and infrared spectra to a focal point. The thermal energy collection apparatus also includes a secondary mirror positioned at or near the focal point. The secondary mirror is configured to reflect concentrated solar energy from the reflector. The thermal energy collection apparatus further includes a light trap configured to receive the concentrated solar energy reflected by the secondary mirror. The light trap includes one or more black bodies configured to absorb solar energy entering the light trap, convert the absorbed energy into thermal energy, and transfer the thermal energy away from the light trap via a thermal transfer medium.

In yet another embodiment, a system includes a parabolic solar reflector configured to reflect and focus a majority of solar energy from visible light and infrared spectra to a focal point. The parabolic solar reflector includes a hole. The system also includes a secondary mirror positioned at or near the focal point. The secondary mirror is configured to reflect concentrated solar energy from the parabolic solar reflector through the hole. The system further includes a light trap positioned on an opposite side of the hole of the secondary mirror. The light trap includes one or more black bodies configured to absorb solar energy entering the light trap, convert the absorbed energy into thermal energy, and transfer the thermal energy away from the light trap via a thermal transfer medium. Additionally, the system includes a thermal storage medium connected to the thermal transfer medium. The thermal storage medium is configured to receive and store the thermal energy collected by the one or more black bodies.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 2 illustrates a solar energy collection system, according to an embodiment of the present invention.

FIG. 3A illustrates a side cutaway view of a flattened elliptical light trap, according to an embodiment of the present invention.

FIG. 3B illustrates an end cutaway view of a flattened elliptical light trap, according to an embodiment of the present invention.

DETAILED DESCRIPTION OF THE EMBODIMENTS

Figure 1:
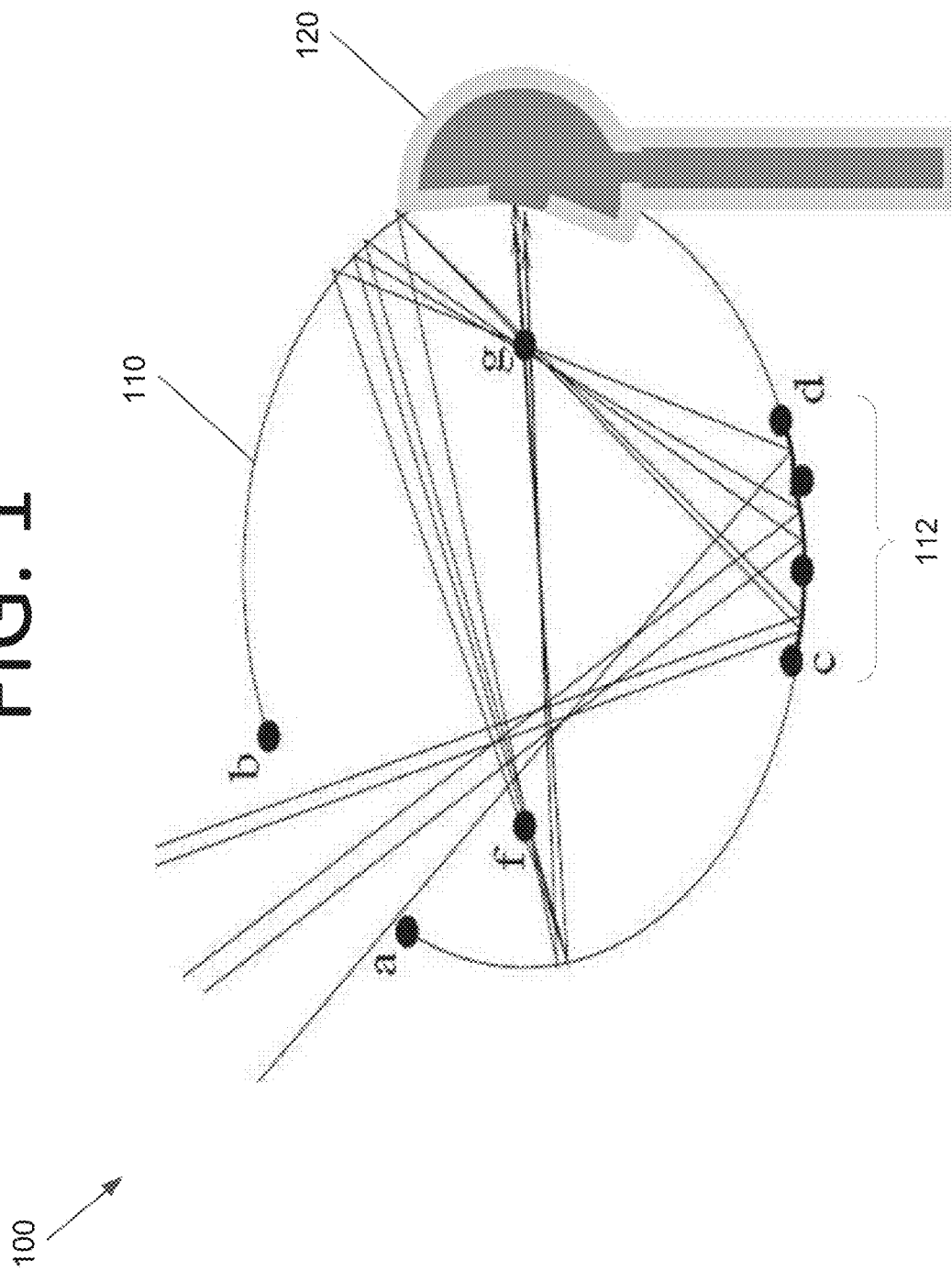
FIG. 1 illustrates a conceptual view of a convex light trap, according to an embodiment of the present invention.

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Some embodiments of the present invention convert solar energy from multiple spectra, including infrared, into thermal energy. These embodiments may take advantage of always-available sources, such as infrared, and non-constant sources, such as visible light and UV. Such embodiments have a reflector including a reflective surface configured to reflect and concentrate significant quantities of at least infrared and visible light energy, and a light trap configured to trap the reflected solar energy. Embodiments also have a collector (black body) included with or otherwise attached to the light trap that is configured to receive and absorb the concentrated solar energy and convert significant quantities of the concentrated solar energy into thermal energy.

At nearly any location where humans live today, data has been collected that shows the infrared energy level varies very little throughout the solar year. Infrared energy is available in measurable quantities at all times, with only a 7% variation from its peak throughout the year. Further, there is little or no difference in the amount of infrared energy that is available between day and night.

The Earth's surface and the clouds absorb visible and invisible radiation from the Sun and re-emit much of the absorbed energy back into the atmosphere as infrared energy. Certain substances in the atmosphere, chiefly cloud droplets and water vapor, but also carbon dioxide, methane, nitrous oxide, sulfur hexafluoride, and chlorofluorocarbons, absorb this infrared energy and re-radiate it in all directions, including back towards the Earth's surface. Thus, the greenhouse effect keeps the atmosphere and surface much warmer than if the infrared absorbers were absent from the atmosphere.

The infrared spectrum can provide a reliable and predictable energy source that has the potential to make solar thermal systems competitive with, if not cheaper than, "dirty" power sources such as fossil fuels. Millions of petrawatts of solar energy strike the Earth constantly. Also, at 51%, infrared accounts for a majority of the solar energy that reaches the Earth. Conventional reflectors only reflect a small amount of this majority of solar energy. Further, conventional receptors reflect and re-emit the vast majority of available infrared energy where light energy is concentrated.

In some embodiments of the present invention, the reflector is configured to reflect solar energy from 100 μm to 2,800 μm. The reflector may include one or more of various combinations of metals, ceramics, or plastics. Combinations of gold may be the best known reflectors of the infrared portion of the spectrum and combinations with other metals, such as aluminum, silver, copper, and nickel, may reflect the total solar spectrum. Ceramics such as aluminum oxide, proprietary ceramics such as Accuflect®, and plastic composites such as aluminized Mylar® manufactured by DuPont®, may also be used reflect a large percentage of the infrared spectrum, as well as be combined with other materials to provide near-total solar spectrum reflectivity. A commercially available and highly efficient reflectant of over 95% of the solar spectrum is 3M® ECP 305+.

The metal or alloy that is used generally determines the reflective characteristics of the mirror. Aluminum is likely the cheapest and most common coating, and yields a reflectivity of around 88%-92% over the visible spectrum. More expensive is silver, which has a reflectivity of 95%-99% even into the far infrared spectrum, but suffers from decreasing reflectivity (<90%) in the blue and UV spectral regions. Likely the most expensive is gold, which gives excellent (98%-99%) reflectivity throughout the infrared spectrum, but limited reflectivity at wavelengths shorter than 550 nm, resulting in its gold color.

Many embodiments of the present invention use materials in the reflector that are generally selected for their high degree of reflectivity across the full solar spectrum, and may have high reflectivity in all segments of the infrared spectrum. Materials such as many types of glass actually reflect much of the infrared spectrum, so the conventional practice of encasing the reflector in glass, or even isolating it with a vacuum, only enhances the collection of the visible solar spectrum while sacrificing any viable ability to collect infrared energy. For this reason, among others, conventional systems are not capable of capturing a significant amount of thermal energy from the infrared spectrum. Further, most black bodies used as collectors do not operate well at high temperatures, especially in an oxidizing environment such as the Earth's atmosphere.

In many embodiments, the reflector (e.g., a trough, field, or mirror) focuses on a tower or parabola that, in turn, focuses the solar energy into a receptor (a light trap) to facilitate concentration of solar energy. The concentration at or near the focal point of the reflector using the available infrared portion in some embodiments may be sufficient to generate temperatures of 200° C. to 2000° C. This may accommodate hot water heaters, thermal sources for thermal absorption devices on the lower temperature scale. For hot water heaters at the collection point, not the temperature to which the water will be heated, the upper range would be approximately 280° C. with a probable low of ~100° C. in certain embodiments. However, in some embodiments, the hot water heater's energy supply may have to be scaled down so that the high temperature collection is mixed through a heat exchanger that comes in contact with the water so the average temperature in a hot water tank would be in the typical safety range of between 60-80° C., depending on local safety regulations.

At the upper end of the temperature range, sufficient temperatures may be provided for metallurgical, glass, and ceramics processing applications. Industrial processes such as melting of certain metals, including copper, iron, steel, and nickel, need temperatures starting at as low as 1000° C. and as high as 1600° C. For the manufacture of glass, simple window glass could be made at ~1200° C. and some laboratory glass could be in the range of 1500° C. For ceramics, the temperature may approach 2000° C., and the range could be from 1000-2000° C., for example.

For electrical generation, it may depend on the method. Generally, steam generation requires at least ~390° for anything that is commercially viable and preferably closer to ~550° C. For gas turbine production, temperatures can range from 1000-1750° C. in some embodiments depending on the turbine and the situation in which the system is being driven. For example, if running multiple turbines and there is some distance between the turbine sets, a higher temperature may allow a constant temperature, taking into consideration some losses (however minor) between the different turbines. As such, the temperature to manufacture electricity may run from 392-1750° C. in certain embodiments.

In many embodiments, temperatures are achieved that are high enough to drive off-the-shelf combined cycle gas turbines, super critical steam, and/or high efficiency Stirling engines, or to be used in the manufacturing of ceramics, concrete, and processing of steel and other metals. Because the collected energy is efficiently managed, the end-to-end costs are competitive with the most advanced gas generation technologies and overwhelmingly more economical than using carbon sources in any direct thermal industrial application. Economies of scale reduce costs with widespread adoption and implementation, and government subsidies offered for green technologies may reduce costs even further.

A receptor is designed based on the concept of a "light trap" in some embodiments. The receptor has a geometry such that the solar energy enters a specific point of two opposing elliptical-shaped composite mirrors, for example. Such mirrors may reflect from 90% to over 98% of solar energy in some embodiments, depending on the reflectivity with respect to the UV, visible and near-infrared spectrum. These highly reflective surfaces bounce the energy back and forth, and return none or only a small quantity of the solar energy in the direction from which it came in.

In many embodiments, an infrared reflective surface may be used on existing trough systems, other parabolic designs, solar towers, or any other suitable system. Such retrofitted systems may collect as much as ⅔ more energy, and may further collect energy 24 hours a day. In order to convert the concentrated solar energy into thermal energy, a light trap with at least one black body is added in accordance with some embodiments of the present invention. In this manner, existing systems can be retrofitted into brand new systems for solar energy collection and storage as thermal energy.

In retrofitted systems, the following components are generally required: (1) a reflector with a broad spectrum reflectant material; (2) a light trap that prevents most of the reflected solar energy from being re-radiated as thermal energy (particularly infrared); and (3) at least one wide spectrum black body. The combination of these components enables efficient concentration of a wide spectrum of solar energy, and the storage of a large portion thereof as thermal energy. In some embodiments, a structural plastic laminate reflective panel using 3M® ECP 305+ may be used as a reflector and be combined with an extruded aluminum substructure mounted on an extruded concrete column. The panel reflects a broad spectrum of solar energy.

In some retrofitted embodiments, an articulating trough, as is commonly used in many solar thermal applications, may have a reflective film added to the surface that reflects a broad range of the solar spectrum. A cylindrical light trap with one or more black bodies may be placed at the focal point. A thermal transfer system may be added to transport the energy to a load or to thermal storage. To allow movement of the heat, a proximity heat exchanger similar to those discussed in U.S. patent application Ser. No. 13/326,454 may be used. When near the equator, a single plane of movement may be realized by creating a crescent-shaped opening to admit the solar radiation so seasonal variations are adjusted and allow the unit to follow the elevation of the Sun. In a variation ideal for use for above the Tropic of Cancer and below the Tropic of Capricorn, a horizontal opening and a second proximity heat exchanger may be used, the first moving with the elevation the second moving with the azimuth (see FIG. 6, for example). This creates a trough that follows the Sun on two planes.

In certain embodiments, a tower design may be used. In such a design, the mirrors may be replaced with panel laminates that reflect a broad portion of the solar spectrum. The field design may also be changed to harmonize with the solar Analemma. These panels may be clad in a film such as 3M® ECP 305+. This is a 3-dimensional field that may be tuned such that the primary source of energy is the infrared spectrum, taking advantage of the near-constant availability of infrared energy. The collection area may be devised so that during the winter days, more mirrors can be used to collect visible light radiation. The gross collection may be focused on collection of the infrared spectrum at night, with reserves being stored by thermal storage units to adjust output variations and for peaking needs of the grid. The energy from various sections of the field may be focused on a bank of light traps having black bodies that follow the contour of the field, allowing numerous field points where any point in the field can collect the available energy.

In some embodiments, a single plane total solar radiation collector is used. The collector may be fabricated from a structural plastic laminate cladded with a film that reflects a broad range of the solar spectrum. Aluminum piping, light traps/black bodies, an aluminum frame, and a simple mechanism to adjust the slope to compensate for the azimuth may also be used. The trough may have a modified light trap black body cluster that incorporates Fresnel lenses made from an infrared transparent plastic. The purpose of this solar thermal design may be to allow the collectors to be used on roofs, or otherwise incorporated into building design. More robust variations can be used in solar fields and designed into stadiums, office parks, and other commercial buildings to provide thermal energy for absorption chillers, air conditioning, freezers, electricity, and/or thermal energy that is typically under 800° C. for industrial thermal applications.

In some embodiments, electrical generation at the focal point may occur via Stirling engines. The use of a highly efficient thermal transfer system, such as graphite foam encapsulated in layers of refractory and insulation as discussed in U.S. patent application Ser. No. 13/361,877, may enable heat from solar energy to be harvested. This thermal transfer system can move the collected thermal energy from the black body rapidly with minor losses to one or more "loads" (such as Sterling engines) for immediate use, or to thermal storage for use on-demand.

FIG. 1 illustrates a conceptual view of a convex light trap 100, according to an embodiment of the present invention. In this embodiment, a parabolic section 112 of an ellipse 110 from point c to point d has been flattened into a parabola. Ellipse 110 can be thought of as an ellipse with a window, or opening, between point a and point b that allows light to enter. It should be understood that the light entering the window may come directly from the Sun or be reflected into the window by a lens, mirror, a system of lenses and/or mirrors, etc.

As light beams traveling in disparate directions enter through the window between a and b, the light beams strike parabolic section 112 and are reflected through focal point g onto the right wall. After reflecting off of the right wall, the light beams are focused through focal point f and strike the boundary of ellipse 110 to the left of f. These light beams then pass back through focal point g and are absorbed by black body 120 integrated into light trap 100. While only a single black body 120 is shown, in other embodiments, multiple black bodies and/or multiple windows may be used.

In some embodiments, black body 120 may include a high temperature ceramic mixture of zirconium diboride ($ZrB_2$), possibly in a mixture of silicon carbide (SiC), or pure $ZrB_2$ coated with a thin coating of various ceramics such as cubic boron nitride (BN), or other materials such as stabilized zirconium dioxide ($ZrO_2$). Zr may be more useful in its phase "stabilized" state. When heated, pure Zr may go through disruptive phase changes. By adding small amounts of a material such as yttrium oxide ($Y_2O_3$), such phase changes may be eliminated, and the material may exhibit superior mechanical and electrical properties. Alternatively, forms of graphite can be impregnated into the $ZrB_2$ to create a gas-tight barrier to prevent oxidation at the high end of the temperature range.

Black body 120 may be integrated with a solid state thermal transfer system including a thermal transfer medium. In some embodiments, the thermal transfer medium may be PocoFoam® or a similar graphite foam, for example, that is interconnected to the black body with BN to accommodate thermal expansion. However, any suitable thermal transfer medium may be used. This solid state thermal transfer system may be sealed in gas-tight containment filled with an inert gas such as argon when operating at temperatures above approximately 400° C., where there may be a risk of oxidation of the graphite or disassociation of the BN. In some embodiments, this same receptor design can be used for low temperature hot water systems, as well as for high temperature metallurgic applications.

Light trap 100 effectively traps a majority of the incoming solar radiation that enters through the window. The energy that is lost is that which is absorbed by the mirrored surface of ellipse 110 before the solar radiation can be absorbed by black body 120.

To design an effective black body, it should be understood that solar radiation is electromagnetic in character and is driven by the same scientific principles as other forms of electromagnetic energy. In order to effectively understand absorption of solar radiation, the solar radiation should be divided into its three basic forms and the differences in how each is absorbed should be noted. Conventional systems for collecting solar energy do not take some of these principles of physics into account.

Only materials that are opaque and do not allow the transmission of any solar radiation or light wave frequencies can absorb solar energy at ultraviolet, visible light, and infrared wavelengths. Such materials may have a chemical composition that includes "absorption centers." Most materials are selective in their absorption of light frequencies. The frequencies of the spectrum which are not absorbed are either reflected back or transmitted for our physical observation. In the visible portion of the spectrum, this is what gives rise to color. Color centers are largely responsible for the appearance of specific wavelengths of visible light. Moving from longer (0.7 micrometer) to shorter (0.4 micrometer) wavelengths: red, orange, yellow, green and blue (ROYGB) can all be identified by our senses in the appearance of color by the selective absorption of specific light wave frequencies (or wavelengths).

Mechanisms of selective light wave absorption include electronic and vibrational. In electronic absorption, transitions in electron energy levels within the atom (e.g., pigments) occur. These transitions are typically in the UV and/or visible light portions of the spectrum. In vibrational absorption, resonance occurs in atomic/molecular vibrational modes. These transitions are typically in the infrared portion of the spectrum.

In any solid at any temperature, the primary particles (e.g. atoms or molecules) are not stationary, but rather vibrate about mean positions. In insulators, the capacity of the solid to store thermal energy is due almost entirely to these vibrations. Many physical properties of the solid (e.g. modulus of elasticity) can be predicted given knowledge of the frequencies with which the particles vibrate. Once the energy is absorbed by a receptor that: (1) incorporates pigments that are opaque to the visible light spectrum; (2) provides a receptive path for the electron movement created by the absorption of UV radiation; and (3) is sensitive to the vibration that exploits the elasticity that manifests itself with "bond stretching" in solid material that characterizes the absorption of infrared radiation, the next aspect of the receptor's physic occur—namely, interim storage of the energy.

As the energy is primarily vibrational at this point, rapidly moving electrons are the physical mechanism for storing mechanical energy of motion in condensed matter through heat, or thermal energy. Thus, heat is motion at the atomic and molecular levels. The primary mode of motion in crystalline substances is vibration. Any given atom will vibrate around some mean or average position within a crystalline structure, surrounded by its nearest neighbors. This vibration in two dimensions is analogous to the oscillation of a clock's pendulum. It swings back and forth symmetrically about some mean or average (vertical) position. Atomic and molecular vibrational frequencies may average on the order of $10^{12}$ cycles per second (hertz).

In order to provide a rapid conduit for this atomic and molecular vibration to travel such that it can be utilized, an efficient thermal transfer medium may be employed. For example, a carbon foam such as PocoFoam® that exhibits thermal transfer several times faster than pure copper and pure aluminum may be used. In many embodiments, an energy collection system is configured such that a constantly cooler mass is in direct connection with the receptor via the graphite foam and, as in certain forms of heat transfer, the transfer may occur simultaneously or nearly simultaneously. An example is thermal transfer in transparent fluids. One of the driving forces of nature is the dynamic flow of energy within the environment across one or many systems to achieve a state of harmonious balance and systemic equilibrium.

The driving force behind the transfer of thermal energy in many embodiments of the present invention is an existing temperature differential between two connected systems. Residual thermal energy from the black body within the light trap may be simultaneously or nearly simultaneously transferred in an attempt to equalize the temperature of both systems. In other words, the energy (i.e., the vibrations) is being transferred from the higher temperature system to the lower temperature system.

FIG. 2 illustrates an embodiment of a solar energy collection system 200, according to an embodiment of the present invention. A trough 210 reflects light onto an elongated light trap 220 containing a black body. Trough 210 may be coated in, or otherwise include, any suitable reflective material. Elongated light trap 220 has a window on the underside (not visible here) which may take the form of a slit extending horizontally along elongated light trap 220. Elongated light trap 220 may operate in accordance with the principles illustrated in FIG. 1. A black body (not shown)

extends horizontally along the length of elongated light trap 220 and collects and transfers the absorbed solar energy as thermal energy.

FIG. 3A illustrates a side cutaway view of a flattened elliptical light trap 300, according to an embodiment of the present invention. In some embodiments, flattened elliptical light trap 300 may be elongated light trap 220 of FIG. 2, and may operate in accordance with the principles discussed with respect to FIG. 1. The outside of flattened elliptical light trap 300 is covered with a weatherized graphite foam heat exchanger 310, which disburses excess heat into the air. Within heat exchanger 310 is a reflective section 320 having a highly reflective mirrored surface 322. Mirrored surface 322 is implemented on reflective section 320 via a pair of flattened ellipses, as better illustrated in FIG. 3B. Attached to part of mirrored surface 322 is a black body 330 configured to convert concentrated solar energy into thermal energy.

FIG. 3B illustrates an end cutaway view of flattened elliptical light trap 300, according to an embodiment of the present invention. An opening 340 permits photons to enter flattened elliptical light trap 300. By the design of a reflector surface such as a trough (not shown) that directs light into flattened elliptical light trap 300, some photons, such as 302, may directly strike black body 330. Other photons, such as 304, may enter flattened elliptical light trap 300 at an angle such that they do not directly strike black body 330. Such photons may reflect off of left flattened ellipse 324 and right flattened ellipse 326 of reflective surface 322 until they strike black body 330. It is understood that the flattened ellipses are not necessarily drawn to scale or in the precise shape that would be used in a practical implementation thereof, nor are the paths necessarily those that would actually be taken by a photon. Flattened ellipses 324 and 326 create two opposing elliptical shapes. With such a configuration, the chance of photons finding the exact same angle to be re-emitted before they hit the black body is generally remote. A person of ordinary skill in the art will understand that a single reflective surface, multiple parabolic reflectors, or any other suitable configuration may be used to reflect light onto one or more black bodies in some embodiments.

Figure 4A:
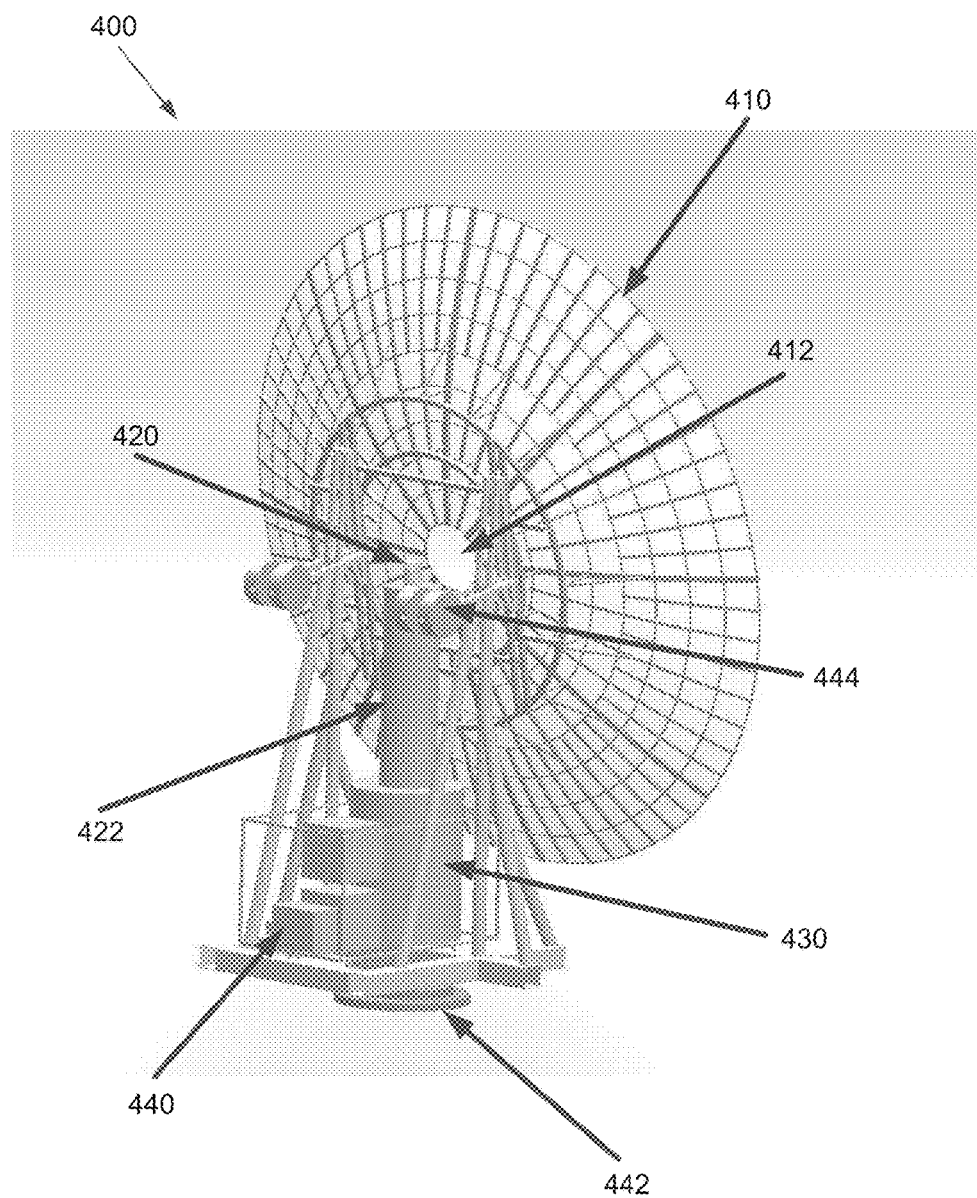
FIG. 4A illustrates a rear view of a solar energy collection and storage system, according to an embodiment of the present invention.

FIG. 4A illustrates a rear view of a solar energy collection and storage system 400, according to an embodiment of the present invention. Solar energy collection and storage system 400 includes a parabolic solar reflector 410 having a hole 412 in the center. The deflection of the assembly may be kept to a minimum during normal operating conditions. All radial and lateral support elements of parabolic solar reflector 410 may maintain support for various mirrored panels making up the reflective surface to maintain a perfect or near-perfect parabola. The radial and lateral support elements may be constructed from steel or any other suitable material.

Parabolic solar reflector 410 generally has a highly reflective mirrored surface configured to reflect large amounts of solar energy. Parabolic solar reflector 410 and hole 412 may have any suitable size. For instance, in some embodiments, parabolic solar reflector 410 may have a diameter of 12 meters and hole 412 may have a diameter of 1.2 meters. Parabolic solar reflector 410 may be composed of any suitable material that reflects a significant portion of the solar energy spectrum, such as those discussed above.

Figure 4B:
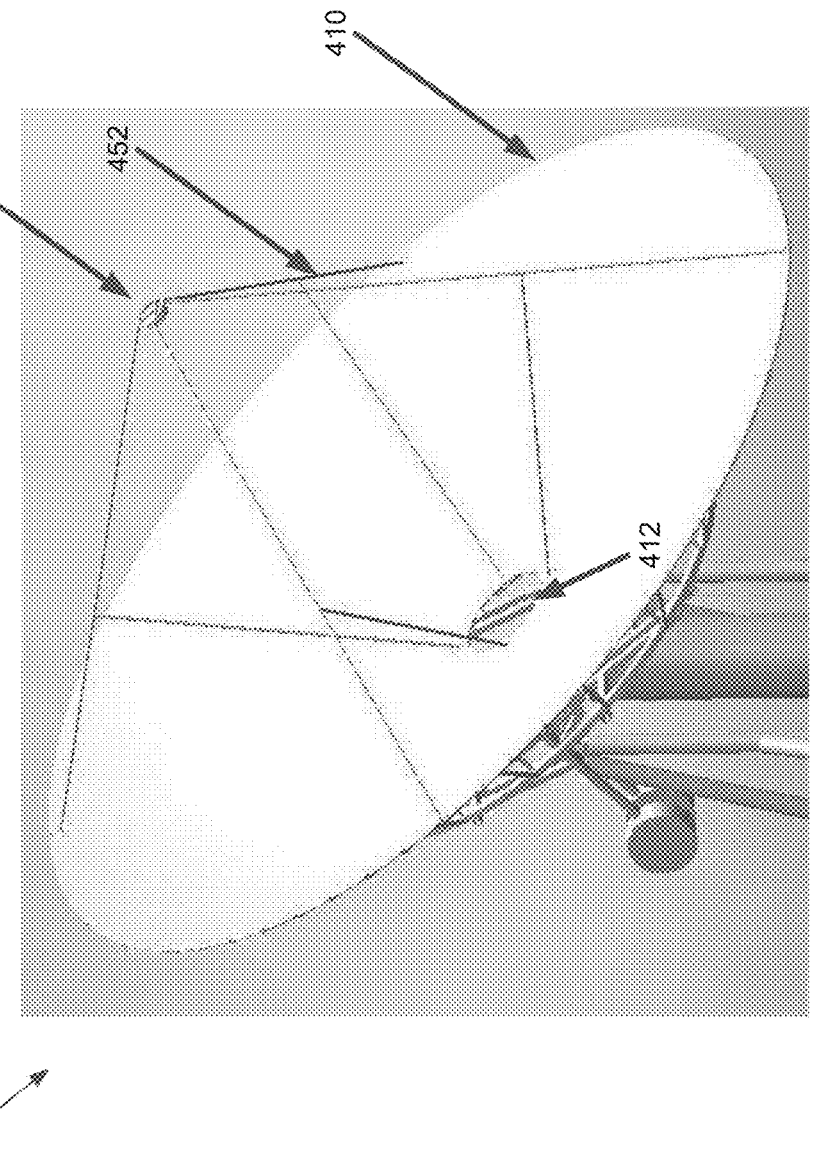
FIG. 4B illustrates a front view of the solar energy collection and storage system, according to an embodiment of the present invention.

While this embodiment makes use of a secondary mirror 450, as shown in FIG. 4B, in some embodiments, no hole may be present. Instead, a light trap may be located in the place of secondary mirror 450. In such embodiments, the light trap may be integrally connected to supports (such as supports 452 of FIG. 4B) and may transfer thermal energy through a thermal transfer medium contained within one or more of the supports to a thermal storage unit, or for use to do work. In other embodiments, parabolic solar reflector 410 may not have a hole and may focus light into an externally located light trap that is unconnected to parabolic solar reflector 410 and shares a separate thermal transfer and storage system.

In FIG. 4A, parabolic solar reflector 410 may move vertically via gearing 442 and rotate via gearing 444 by means of electric drive motor 440, which drives the gearing mechanisms. Gearing 442 may be a turntable that is capable of supporting the mass of thermal storage unit 430, which may be 39,000 kg or more in some embodiments. The central axis of thermal storage unit 430 may be mounted directly over the axis of rotation of the gearing 442, and gearing 442 may be capable of a full 360° of rotation. Gearing 444 may be capable of facilitating articulation of parabolic solar reflector 410 to follow the path of the Sun throughout the year, and may be capable of articulating from horizontal (perpendicular to the horizon) to vertical (straight up). Further, parabolic solar reflector 410 may be capable of being locked in the vertical position for protection of solar energy collection and storage system 400 during high wind conditions.

However, any number of motors, swiveling, and turning mechanisms may be used in other embodiments to provide any desired range of motion/articulation along any axis and in any direction. An electronic controller (not shown) may serve to operate electric drive motor 440 and control the direction in which parabolic solar reflector 410 is facing in order to track the Sun, for example, and increase the amount of solar energy that is collected, particularly from the visible light and UV spectra. Solar energy collection and storage system 400 may also have adjustable counterweights (not shown) for balancing of the assembly.

Solar energy reflected by parabolic solar reflector 410 is focused on secondary mirror 450 and reflected into light trap 420. In this embodiment, light trap 420 is a tower light trap. One or more black bodies within light trap 420 absorb solar energy and convert the absorbed solar energy into thermal energy. The one or more black bodies of light trap 420 are integrally connected to a thermal transfer medium 422 that transfers the thermal energy to a thermal storage unit 430. In some embodiments, thermal storage unit 430 and thermal transfer medium 422 may be similar to those discussed in U.S. patent application Ser. No. 13/361,877, employing similar principles and/or materials.

FIG. 4B illustrates a front view of solar energy collection and storage system 400, according to an embodiment of the present invention. As can be better seen from this perspective, secondary mirror 450 is suspended above parabolic solar reflector 410 by supports 452. Typically, secondary mirror 450 is positioned at a focal point of parabolic solar reflector 410 so as to efficiently reflect concentrated solar energy. Secondary mirror 450 is generally relatively small so as not to cast a significant shadow on parabolic solar reflector 410, and parabolic solar reflector 410 is generally pointed at the Sun in this embodiment so no shadow from secondary mirror 450 is cast on the collection surface.

Figure 5:
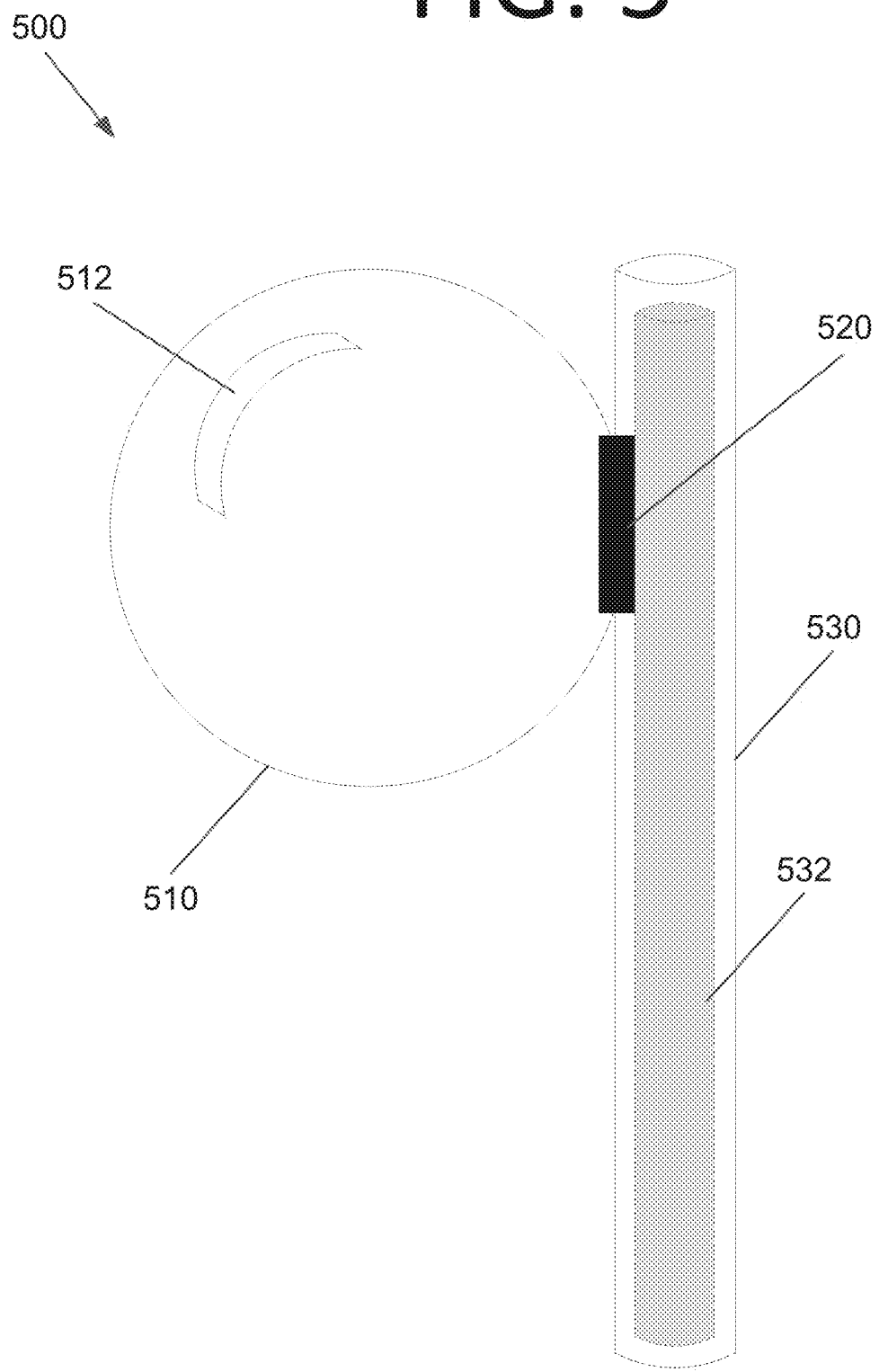
FIG. 5 illustrates a side view of a solar-to-thermal conversion system, according to an embodiment of the present invention.

FIG. 5 illustrates a side view of a solar-to-thermal conversion system 500, according to an embodiment of the present invention. Solar-to-thermal conversion system 500 includes a light trap 510 having an opening 512 that receives solar energy reflected by a reflector (not shown). Opening 512 of light trap 510 may be shaped in the same arc that the Sun's movement follows from after sunrise (75° east) to before sunset (75° west), and may take any desired shape to facilitate the entry of light. In some embodiments, light trap 510 may move independently of a reflector assembly. In some embodiments, light trap 510 may be light trap 420 of FIGS. 4A and 4B. Light trap 510 may also be designed so as to operate in accordance with the principles of FIG. 1.

A black body 520 is housed within light trap 510 and passes through thermal transfer tower 530, contacting a thermal transfer medium 532. As solar energy is absorbed and converted to thermal energy by black body 520, the thermal energy is transferred through thermal transfer medium 532 to a thermal storage unit or used to do work, such as drive an engine or turbine, heat water, or for any other suitable use as would be understood by one having ordinary skill in the art. Thermal transfer medium 532 may transfer the thermal energy to storage or to do work by means of a proximity heat exchanger (not shown).

Figure 6:
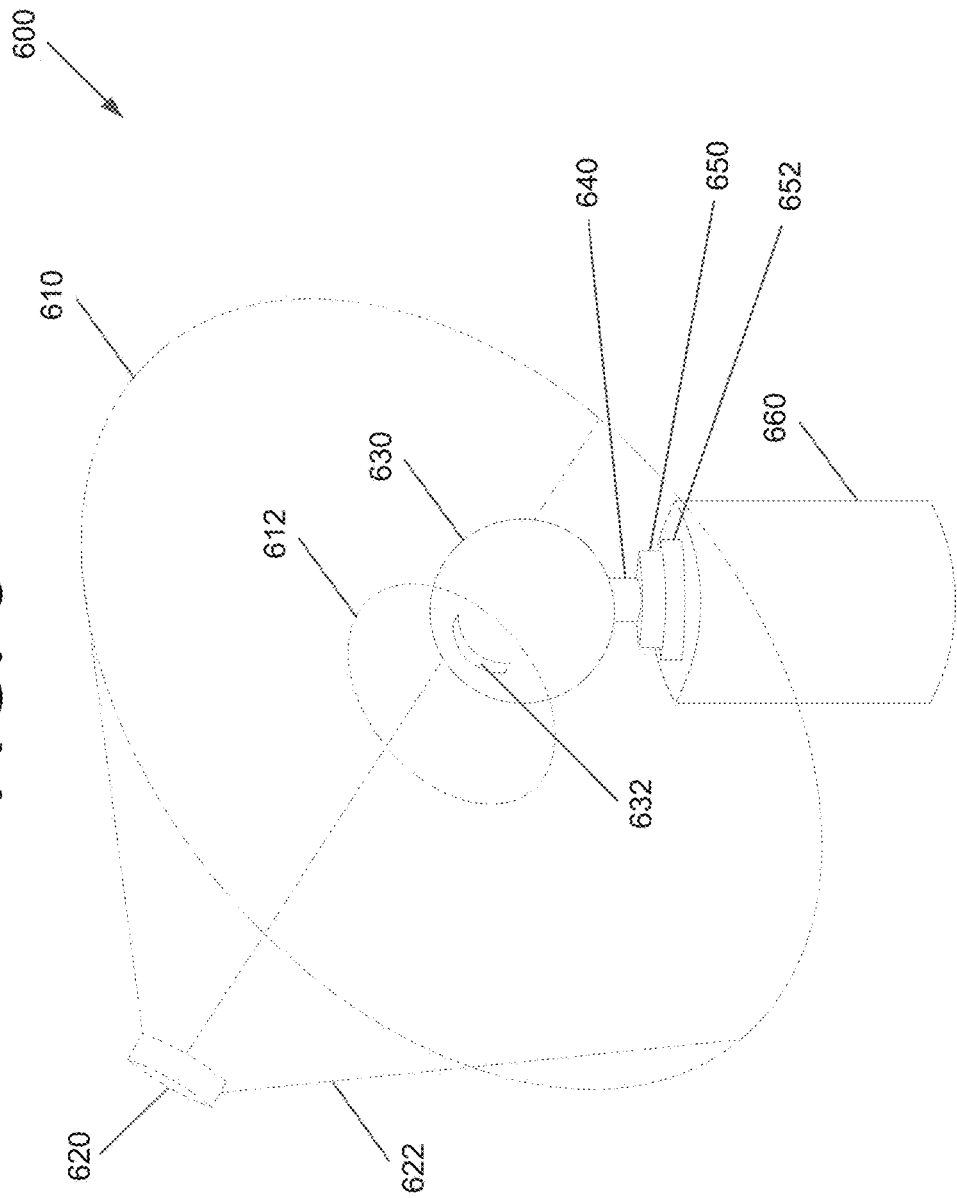
FIG. 6 illustrates a side view of a solar-to-thermal conversion system, according to an embodiment of the present invention.

FIG. 6 illustrates a side view of solar-to-thermal conversion system 600, according to an embodiment of the present invention. Similar to FIG. 4B, solar-to-thermal conversion system 600 has a reflector 610 with a hole 612, and a secondary mirror 620 held in place by supports 622. These elements are shown with dashed lines to more clearly illustrate features that would otherwise be obscured.

A light trap 630 is positioned to receive light reflected by secondary mirror 622 via hole 612. Similar to FIG. 5, light trap 630 includes a black body (not shown) that converts solar energy into thermal energy. Light enters via opening 632. A pivot and drive mechanism 640 allows light trap 630 to move. Behind is a first proximity heat exchanger 650 allowing light trap heat exchanger to track elevation. Underneath is a second proximity heat exchanger 652 that allows light trap/black body to follow the azimuth via a slew bearing. A thermal storage unit 660 stores thermal energy collected by light trap 630 and transferred via the proximity heat exchangers.

Figure 7A:
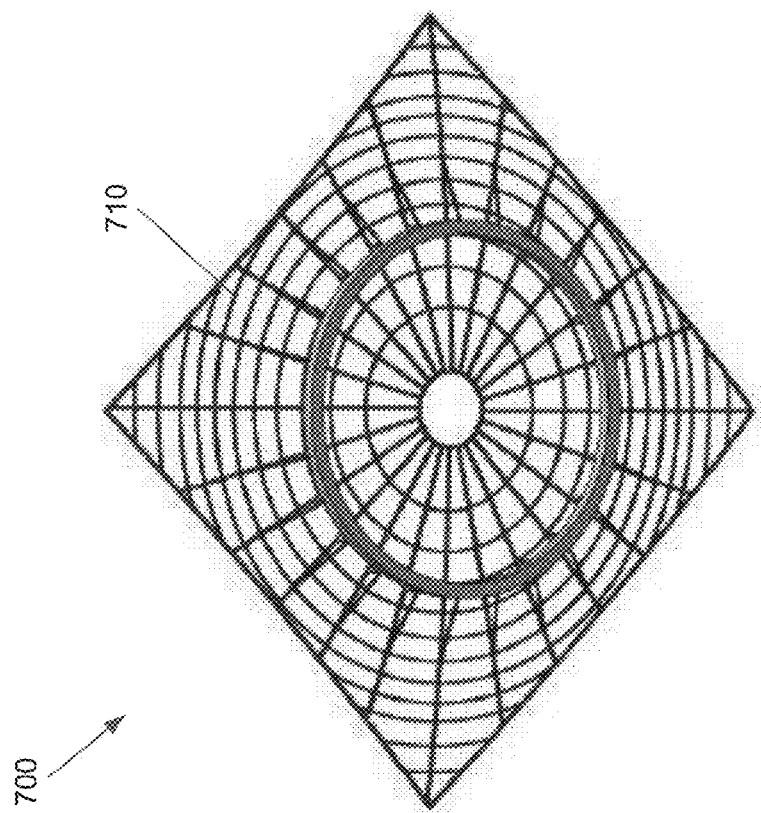
FIG. 7A illustrates a perspective schematic view of a square elliptical solar reflector, according to an embodiment of the present invention.

FIG. 7A illustrates a perspective schematic view of a square elliptical solar reflector 700, according to an embodiment of the present invention. Square elliptical solar reflector 700 and three or more light trap receptors (not shown) may be aligned in the northern hemisphere to the south, east or west, depending on best available Sun in some embodiments. Square elliptical solar reflector 700 may be a large structure (50 or 60 meters squared in some embodiments) and can be incorporated into the architecture of a building to make efficient use of the space underneath. The light trap may be sloped at the optimal angle of the latitude at which they are located. The light trap may also be fixed and deliver thermal energy to thermal storage or to a load (such as a Stirling engine), and thus generate direct thermal or thermal electric energy.

Square elliptical solar reflector 700 may be expanded with consecutive rings 710 and supported with a foundation structure (not shown) and frequent centers that support the frame. This may reduce the need for extremely strong structural strength. In some embodiments, square elliptical solar reflector 700 may be somewhat flexible and may be designed to roll and pitch in an earthquake. In some square elliptical embodiments, instead of being constructed on top of an "A-Frame" structure, as shown in FIG. 4A, square elliptical solar reflector 700 may be mounted on a fixed base. Fixed embodiments of square elliptical solar reflector 700 may be incorporated into the design of a building, and may have wings to square the circular shape, space-permitting. Such embodiments may be especially useful in storm-prone regions and could be engineered to survive the worst impact of very high winds from a hurricane or typhoon, for example. These designs may use Acrylonitrile-Butadiene-Styrene (ABS) plastic, metal, and a solar reflective film on composite panels, and aluminum false works that, when populated on the frame, create a perfect or near-perfect optical parabola.

Figure 7B:
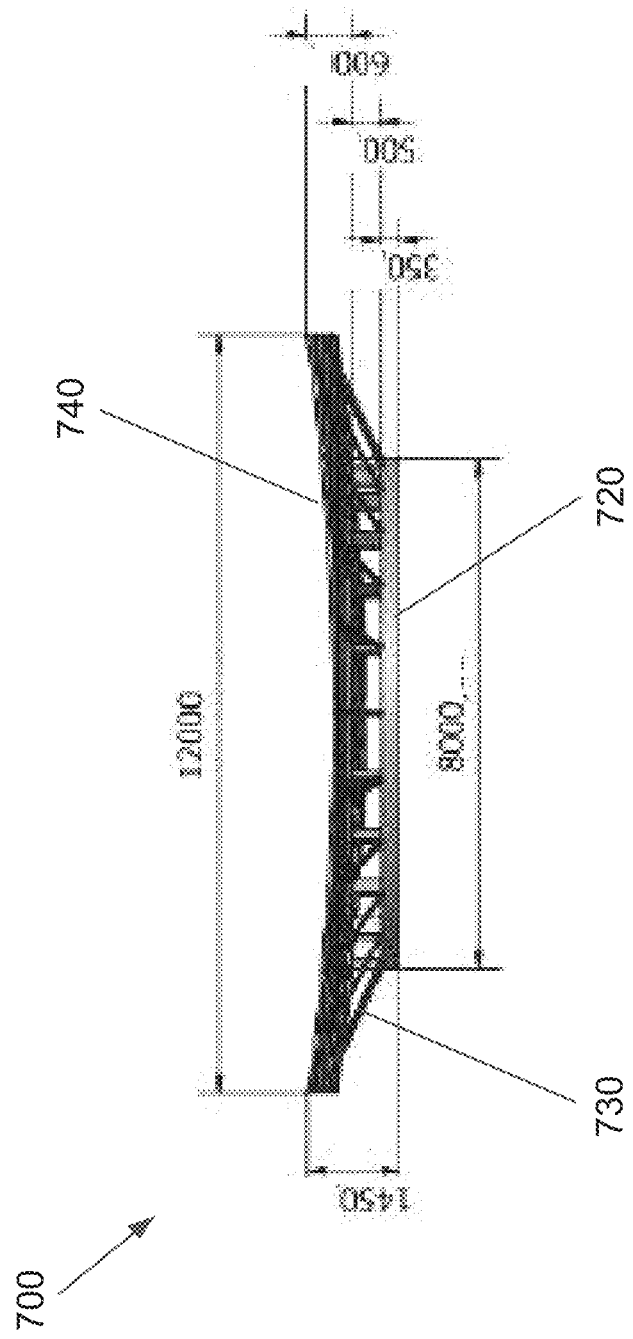
FIG. 7B illustrates a side schematic view of a square elliptical solar reflector, according to an embodiment of the present invention.

FIG. 7B illustrates a side schematic view of square elliptical solar reflector 700, according to an embodiment of the present invention. In this embodiment, square elliptical solar reflector 700 has a width of 12,000 mm and a height of 1,450 mm. A base 720 of square elliptical solar reflector 700 has a width of 8,000 mm and a height of 350 mm. Supports 730 have a height of 500 mm, and reflecting surface 740 has a height of 600 mm.

Figure 7C:
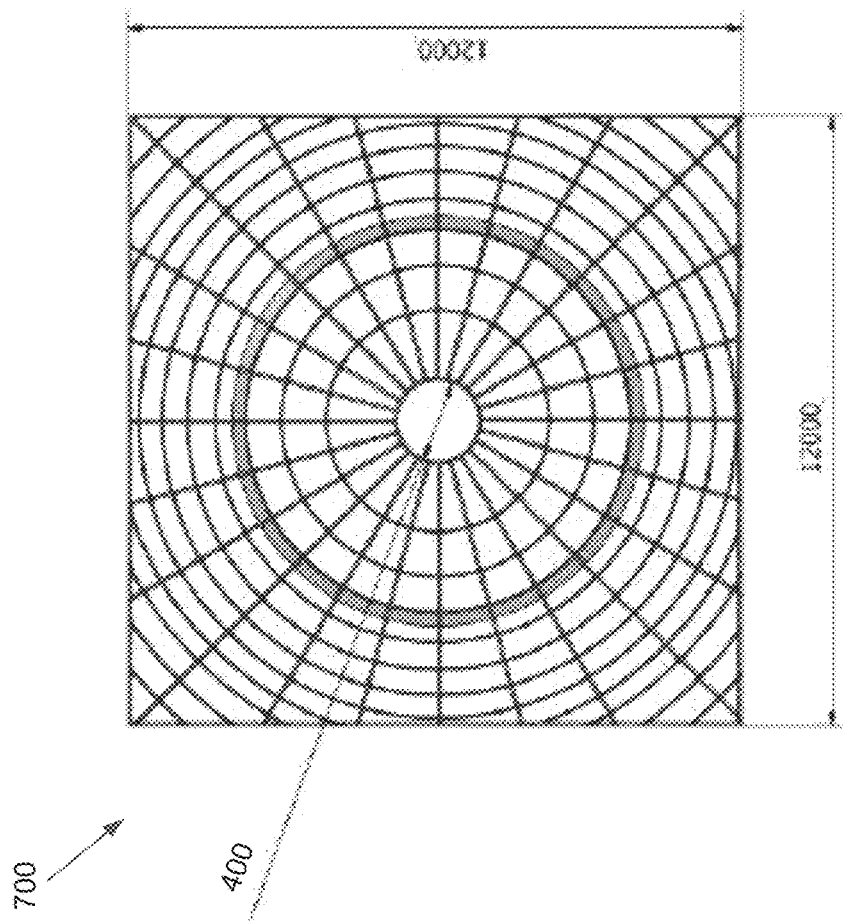
FIG. 7C illustrates a front schematic view of a square elliptical solar reflector, according to an embodiment of the present invention.

FIG. 7C illustrates a front schematic view of square elliptical solar reflector 700, according to an embodiment of the present invention. Each side of square elliptical solar reflector 700 has a width of 12,000 mm. The opening in this embodiment is 400 mm to allow solar energy to be focused on the light trap.

Figure 8:
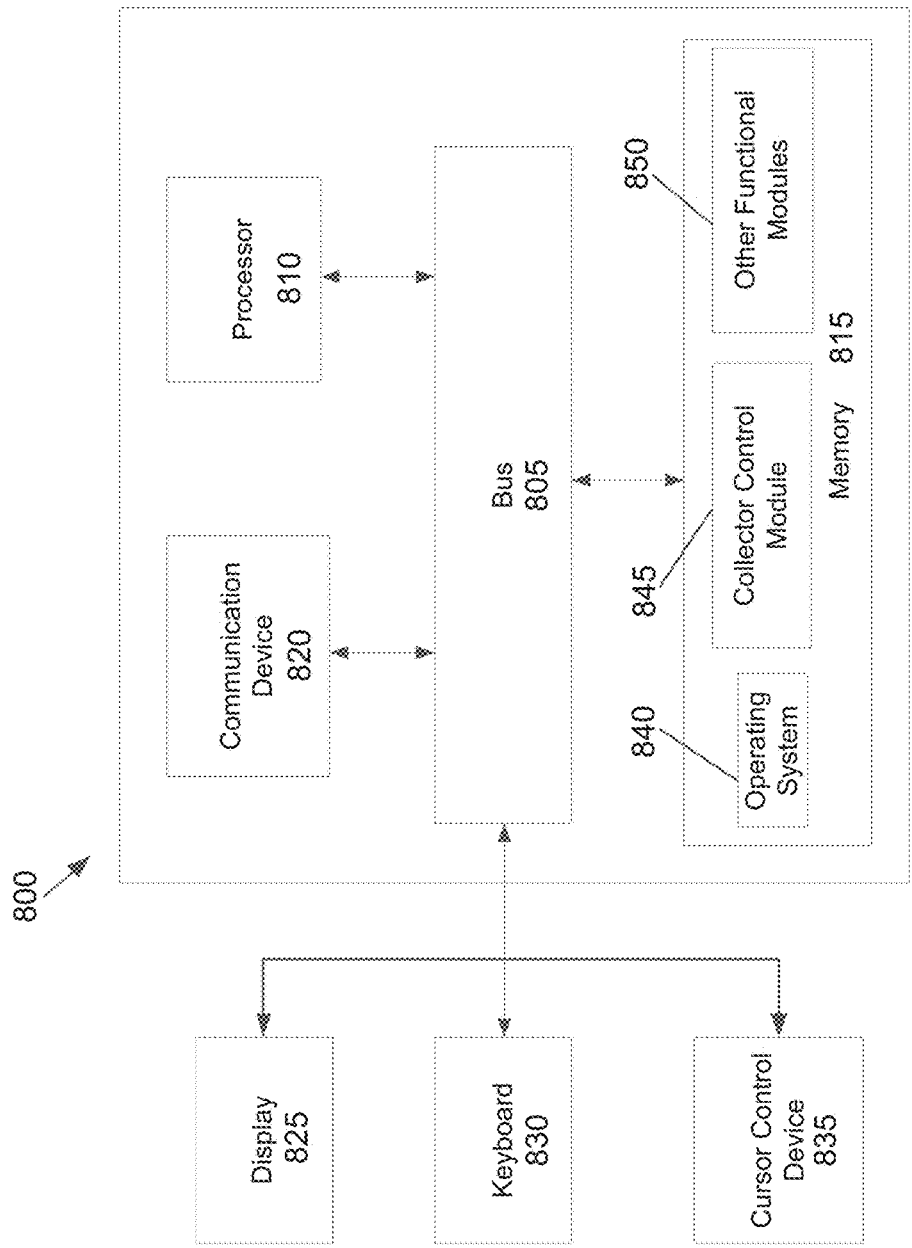
FIG. 8 illustrates a controller for controlling the orientation of a collector, according to an embodiment of the present invention.

FIG. 8 illustrates a controller 800 for controlling the orientation of a collector, according to an embodiment of the present invention. In some embodiments, controller 800 may control operation of electric drive motor 440 and other operational aspects of solar energy collection and storage system 400 of FIGS. 4A and 4B. Controller 800 includes a bus 805 or other communication mechanism for communicating information, and a processor 810 coupled to bus 805 for processing information. Processor 810 may be any type of general or specific purpose processor, including a central processing unit (CPU) or application specific integrated circuit (ASIC). Controller 800 further includes a memory 815 for storing information and instructions to be executed by processor 810. Memory 815 can be comprised of any combination of random access memory (RAM), read only memory (ROM), flash memory, cache, static storage such as a magnetic, optical disk, or solid state memory devices, or any other types of non-transitory computer-readable media or combinations thereof. Additionally, controller 800 includes a communication device 820, such as a wireless network interface card, to provide access to a network.

Non-transitory computer-readable media may be any available media that can be accessed by processor 810 and may include both volatile and non-volatile media, removable and non-removable media, and communication media. Communication media may include computer-readable instructions, data structures, program modules, lookup tables, or other data in a modulated data signal such as a carrier wave or other transport mechanism and includes any information delivery media.

Processor 810 is further coupled via bus 805 to a display 825, such as a Liquid Crystal Display ("LCD"), for displaying information to a user. A keyboard 830 and a cursor control device 835, such as a computer mouse, are further coupled to bus 805 to enable a user to interface with controller 800. Display 825, keyboard 830, and cursor control device 835 may be located separately from controller 800 and may communicate with controller 800 via wireless communication, an Ethernet cable, or any other suitable means for transmitting and/or carrying data. For instance, a common control center may be used to control multiple solar energy collection devices.

In one embodiment, memory 815 stores software modules that provide functionality when executed by processor 810. The modules include an operating system 840 for controller 800. The modules further include a collection control module 845 that is configured to at least control the orientation of a solar collector. Controller 800 may include one or more additional functional modules 850 that include additional functionality.

One skilled in the art will appreciate that a "controller" could be embodied as a personal computer, a server, a console, a personal digital assistant (PDA), a cell phone, or any other suitable computing device, or combination of devices. Presenting the above-described functions as being performed by a "controller" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the controller features described in this specification have been presented as modules in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays (FPGAs), programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a non-transitory computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Some embodiments of the present invention are directed to a system that concentrates a broad spectrum of solar energy, including large amounts of infrared and visible light energy, and converts much of the concentrated solar energy into thermal energy. A reflector reflects concentrated light either directly or indirectly into a light trap. The light trap may be cylindrical, elliptical, or any other desired shape and may contain one or more contiguous or non-contiguous reflecting surfaces. The light trap has one or more black bodies that are configured to receive and absorb the concentrated solar energy and convert it to thermal energy. The thermal energy is transferred via a thermal storage medium to a thermal storage unit and/or used directly to do work, such as to drive a Sterling engine, drive a turbine, heat water to create steam, heat a building, or for any other desired consumer, commercial, or industrial application.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. An apparatus, comprising:
a reflector configured to reflect and focus a majority of solar energy from visible light and infrared spectra, the reflector coated with a film comprising gold and at least one other metal, the at least one other metal reflects a majority of visible light, the reflector having a reflectance across the infrared spectrum of greater than 98%; and
a light trap configured to receive concentrated solar energy from the reflector, wherein
the light trap comprises a solid black body that is configured to absorb a majority of the concentrated visible light and infrared energy and convert the absorbed energy into thermal energy.

2. The apparatus of claim 1, further comprising:
a solid state thermal transfer medium configured to receive thermal energy from the black body either directly or via a proximity heat exchanger and transfer the thermal energy away from the light trap.

3. The apparatus of claim 2, further comprising:
a thermal storage unit configured to receive and store thermal energy from the thermal transfer medium either directly or via a proximity heat exchanger.

4. The apparatus of claim 1, further comprising:
a secondary mirror configured to receive the concentrated light from the reflector and direct the concentrated light into the light trap.

5. The apparatus of claim 1, wherein the light trap comprises an opening configured to receive solar energy based on a path of the Sun throughout the day.

6. The apparatus of claim 1, wherein the reflector comprises a trough, a parabolic reflector, an elliptical reflector, or a square elliptical reflector.

7. The apparatus of claim 1, wherein the black body comprises at least one of zirconium diboride ($ZrB_2$), pure $ZrB_2$ coated with a thin coating of cubic boron nitride (BN), and stabilized zirconium dioxide ($ZrO_2$).

8. The apparatus of claim 1, further comprising:
a second reflector configured to reflect and focus a majority of solar energy from visible light and infrared spectra, wherein
the reflector and the second reflector are in a shape of opposing flattened ellipses, and
the reflector and second reflector are configured to direct a majority of light entering the light trap onto the solid black body.

9. The apparatus of claim 1, further comprising:
a transfer tower comprising a thermal transfer medium, wherein
the solid black body contacts the thermal transfer medium of the transfer tower, and the light trap comprises an opening that receives solar energy reflected by the reflector, the opening shaped in a same arc to follow movement of the Sun from after sunrise to before sunset.

\* \* \* \* \*